Patented Nov. 14, 1950

2,530,272

UNITED STATES PATENT OFFICE 2,530,272

PROCESS FOR REMOVING SEED COAT FROM GRAIN

William B. Thrasher, San Antonio, Tex., assignor to Tex-O-Kan Flour Mills Company, Dallas, Tex., a corporation of Delaware No Drawing. Application April 28, 1947, Serial No. 744,515

6 Claims. (Cl. 146—221.8)

This invention relates to a new and improved process for removing the seed coat from cereal grains. More specifically it relates to a new and improved "wet" milling process for such removal.

Hitherto it has been known that by steeping cereal grains such as corn, in an aqueous, alkaline bath, the seed coats or hulls are swelled and loosened so that they may be more readily removed from the grain by conventional methods such as those involving abrasion or attrition. However, to obtain adequate removal of the hulls by this method, it has been necessary to retain the grain in contact with the alkaline bath for such considerable lengths of time, that some diffusion of alkali together with undesirable coloring and other dissolved substances into the starchy portion of the grain occurs. Furthermore, the alkali which penetrates into the interior of the grain weakens the endosperm so that the endosperm tends to disintegrate during the final mechanical step of removing the seed coat.

It is an object of this invention to provide a process whereby the seed coat of cereal grains is completely, economically and efficiently removed prior to subsequent milling.

It is a further object to provide a process for removing the seed coat of cereal grains prior to milling whereby the grains are subjected to a preliminary treatment which conditions the grain in such a way that the length of time required for the subsequent treatment with an alkaline solution is substantially reduced.

Still another object is to provide a process whereby the seed coat of cereal grains may be completely removed in a relatively short period of time.

Still another object is to provide a process for removing the seed coat of cereal grains whereby the desired interior portion of the grain is substantially unweakened and substantially free of undesirable discoloration.

Other objects and advantages of my invention will become obvious from the following description.

My process comprises, in general, first removing from the seed coats of cereal grain any waxes, oils and fats contained therein, subjecting the treated grain to an aqueous alkaline solution for a sufficient period of time to effect swelling and loosening of the seed coat and then removing the seed coat by any desired method such as attrition or abrasion.

Cereal grains generally contain waxes, oils and fats in their seed coats, in amounts which vary with the particular variety of grain. The presence of such waxes and oils creates a resistance to wetting by water solvents which renders it necessary to maintain the grain in contact with an aqueous alkaline bath for an extended period of time in order to obtain the desired swelling and loosening of the seed coat.

I have discovered that by effecting the removal of waxes, oils and fats from the seed coat subsequent wetting during steepage in an aqueous alkaline bath is facilitated, with a consequent marked reduction in the length of time required for the alkaline solution to accomplish the desired swelling, softening and loosening of the seed coat.

The waxes, oils and fats present in the seed coat may be removed by extraction with a suitable solvent which readily dissolves said waxes, oils and fats. Preferably the solvent employed should be readily removable from the extracted grain by conventional methods. Many organic solvents are particularly suitable for extraction purposes. Examples of such solvents which I have used are petroleum ether, carbon tetrachloride, chloroform and trichloroethylene. I have found that petroleum ether is particularly satisfactory because of its low boiling point and its relatively low cost. Such a product, commercially known as "Pentane," has a boiling point of about 36° C. and may be readily removed from the treated grain by the application of heat under reduced pressure.

The treatment with the wax, oil and fat extraction solvent may be accomplished in any desired manner. For example, the grain may be covered with the solvent which is drained off after a suitable period of time. Another method which may be employed is a "percolation" method which involves allowing a small stream of the solvent to percolate through the grain and repassing the same solvent through the grain until substantially all of the wax, oil and fat contained in the seed coat are removed. Whatever method is employed, it is desirable, after extraction is completed, to rinse the grain with fresh solvent in order to remove the original extraction solvent from the surface of the grain.

After extraction is completed and the solvent drained off it is advisable to remove any traces of solvent remaining in the grain. This may be accomplished by promoting evaporation as by the application of heat and reduced pressures. In general the length of time for which the grain is subjected to the solvent should be sufficient to remove substantially all of the wax, oil and fat but not so long as to cause the grain to become saturated. I have found that about thirty minutes is usually a sufficiently long period to accomplish my purpose without adversely affecting the grain in any way. There is of course some variation in the optimum time interval depending on such factors as the variety of cereal grain being treated.

After the wax, oils and fats present in the seed coat of the grain have been removed the grain is treated with an aqueous alkaline solution for the purpose of swelling and loosening the seed coat. This may be accomplished in any conventional manner, as for example, by steeping the grain in the solution for the necessary length of time. Any suitable alkaline material may be employed such as caustic soda, sodium carbonate, ammonium hydroxide and lime water. I have found caustic soda to be particularly suitable because of its efficiency and low cost.

Since the water repellant waxes, oils and fats have been removed there is no resistance to wetting by the aqueous alkaline solution and the desired swelling, softening and loosening of the seed coat is accomplished in a considerably shorter time than is required when the grain is not given the preliminary treatment of my invention. The period of immersion in the alkaline solution is of such short duration as to substantially eliminate the danger of the alkali and pigmentation compounds in the seed coat diffusing into the interior of the grain in sufficient amounts to cause undesirable discoloration and weakening of the endosperm. The shorter steeping leaves the endosperm stronger and less likely to break up during the mechanical process of removing the loosened seed coat from the grain. This makes the separation easier and more complete and results in a desirable uniform product.

The concentration of the aqueous alkaline solution employed to swell and loosen the seed coat after removal of the fats, oils and waxes, is of course subject to variation depending on such factors as variety and type of grain, inherent moisture content of the grain and the thickness of the seed coat. In general the preferred range of concentration of the caustic solution is from about 0.15 percent to 2 percent, with some variation depending on the type of grain being treated. In the case of sorghum grains, for example, the preferred range of concentration is about 0.25 percent to about 2 percent. Within this range the most satisfactory results are obtained with concentrations of about 0.25 percent to about 0.75 percent. In the treatment of corn, the most satisfactory results within the aforementioned preferred range are obtained with concentrations of caustic soda from about 0.15 percent to about 0.6 percent.

In general the strength of the alkaline solution effects the length of time required for the steeping procedure. In the more concentrated alkaline solutions, the bran is swelled more rapidly with a consequent reduction in the steeping time. However, too high concentrations of alkali should be avoided because of variations in the swelling of the bran on the individual grains with subsequent loss of uniformity in the treated grain.

After adequate swelling and loosening of the seed coat is accomplished, the partially spent alkaline solution is drained off and the grain is rinsed with fresh water to remove all traces of the alkali.

The removal of the seed coat may then be readily accomplished in any desired way as, for example, by any one of several more or less conventional methods involving attrition or abrasion. After the removal of the seed coat from the interior of the grain or endosperm, separation may be accomplished by subjecting the grain mass to additional wash water, allowing sufficient time for the endosperm particles to settle and then decanting off the wash water together with the suspended bran particles.

The endosperm product obtained by my process is substantially uniform in character, unweakened and uncontaminated with undesirable pigmentation compounds and other dissolved substances.

An important advantage of my invention resides in the fact that it enables the recovery of desirable by-products. For example, useful fats, oils and waxes may be recovered by the evaporation or distillation of the organic solvent employed for the extraction of these substances from the seed coat of the grain. The purified solvent is then available for further use as an extraction agent.

The protein and some of the coloring matter which has been removed by the alkaline solution during steeping may be precipitated and recovered by acidifying the combined partially spent steeping solution and wash water, as for example with sulfuric acid. A material suitable for use as a foodstuff may be obtained by combining the dried precipitate from the alkaline steep water and the wash water with the separated bran particles.

In general my process is applicable to any grain such as sorghum, wheat and corn whose processing is simplified or benefited by removing the seed coat. It is particularly applicable to the sorghum grains which contain relatively large amounts of oils, fats and waxes in their seed coats so that they resist wetting by an aqueous solvent to a very substantial extent. I have successfully processed according to my invention such sorghum grains as milo maize, kaffir, hegira, sorgo and feterita.

The more detailed practice of my invention is illustrated by the following examples. It will be understood, however, that they do not limit the scope of my invention in any way.

*Example I*

A ten pound sample of commercial red Milo was covered with petroleum ether and stirred occasionally for thirty minutes. The petroleum ether was then drained from the grain. The grain was rinsed with additional small amounts of fresh petroleum ether. The extraction solvent and the rinse solvent were combined and evaporated. The resulting residue, after further refining, yielded a white waxy solid and a yellow oil.

Any of the petroleum ether solvent remaining with the grain was removed by subjecting the grain to a temperature of 100 degrees C. under partial vacuum for twenty minutes. The grain was then covered with about 0.1 cubic feet of water in which 0.4 ounce of caustic soda, approximately .25 percent by weight of the red Milo, had been dissolved. The grain was allowed to soak in this solution for four hours, after which time the seed coat had been swelled, softened and loosened so that it could be readily removed from the individual grain.

The partially spent caustic solution was then drained from the grain and the grain rinsed or washed in about an equal quantity of fresh water. Acidification of the combined caustic solution and wash water with sulfuric acid resulted in the precipitation of the protein and some of the coloring matter which had been removed from the seed coat by the caustic solution during steeping.

The removal of the softened bran or seed coat was then accomplished by subjecting the grain to the action of a bristle brush revolving in an enclosed case. The resulting grain mass comprising the peeled grain and bran was treated with additional wash water. After allowing sufficient time for the endosperm particles to settle, the wash water was decanted off carrying with it the suspended bran particles.

The desired endosperm product obtained in this manner was substantially uniform in character and uncontaminated with undesirable coloring.

A by-product material suitable for use as a foodstuff was obtained by adding to the bran particles separated from the endosperm, the dried precipitate obtained after acidification of the alkaline steep water and the wash water. This foodstuff contained approximately 35 percent crude protein.

*Example II*

A quantity of red Milo was processed in substantially the same manner as described in Example I except that the concentration of the caustic soda solution was 0.75 percent. The steeping time required to swell the bran so that it could be removed was about thirty-five minutes, indicating that the use of a somewhat stronger alkaline solution reduces the steeping time required.

The following example illustrates the efficacy of my pre-treatment of cereal grain in order to remove the oils, fats and waxes contained in the seed coat, in reducing the steeping time in the aqueous alkaline solution.

*Example III*

One sample of commercial mixed sorghum grain was subjected to the action of a 0.3 percent caustic soda solution without pre-treatment with an oil, fat and wax extraction solvent. Another sample of the same grain was subjected to the action of a 0.3 percent caustic soda solution after pre-treatment with petroleum ether.

(A) The grain which had not been pre-treated required steeping for twenty-eight hours before the bran could be removed. The outside of the resulting peeled grain or endosperm was stained a yellow or greenish tint, indicating that during this long steeping period the alkali had acted unfavorably upon it. Furthermore, the starch granules of some of the grains were stained red and brown from the coloring matter that had soaked through from the seed coat.

(B) The seed coat of the pre-treated grain, on the other hand, was readily removed after a steeping time of only three hours. Only a very slight superficial staining of the endosperm was observed and none of the starchy part showed any red or brown stains.

It is evident therefore that my process greatly reduces the time required for removal of the seed coat and results in a product which is substantially uncontaminated by diffused alkali and undesirable pigmentation compounds. The absence of these contaminating materials from the endosperm also results in a stronger product.

Although this invention has been described with reference to illustrative embodiments thereof, it will be apparent to those skilled in the art that the principles of this invention may be embodied in other forms but within the scope of the appended claims.

I claim:

1. A process for removing the seed coat from cereal grains comprising treating the grain with an oil, fat and wax extraction solvent, substantially completely removing said solvent together with the oily, fatty and waxy materials extracted from the seed coat, subjecting the grain to an aqueous solution containing alkaline reagent, said alkaline reagent being present in a maximum concentration of about 2%, until the seed coat is substantially only swelled and loosened, removing said alkaline solution from the grain, and separating the seed coat from the interior portion of the grain.

2. A process for removing the seed coat from cereal grains comprising treating the grain with an organic solvent whereby oily, fatty and waxy materials are extracted from the seed coat, substantially completely removing said organic solvent from the grain together with said oily, fatty and waxy materials, subjecting the grain to an aqueous solution containing alkaline reagent, said alkaline reagent being present in a maximum concentration of about 2%, until the seed coat is substantially only swelled and loosened, removing said alkaline solution from the grain, and separating the seed coat from the interior portion of the grain.

3. A process for removing the seed coat from cereal grains comprising treating the grain with an organic solvent whereby oily, fatty and waxy materials are extracted from the seed coat, substantially completely removing said organic solvent from the grain together with said oily, fatty and waxy materials, immersing the grain in an aqueous solution of sodium hydroxide said sodium hydroxide being present in a maximum concentration of about 2%, until the seed coat is substantially only swelled and loosened, removing said solution from the grain, and separating the seed coat from the interior portion of the grain.

4. A process for removing the seed coat from cereal grains comprising treating the grain with an organic solvent whereby oily, fatty and waxy materials are extracted from the seed coat, substantially completely removing said organic solvent from the grain together with said oily, fatty and waxy materials, immersing the grain in an aqueous solution having a concentration of about 0.15% to about 2 percent sodium hydroxide until the seed coat is substantially only swelled and loosened, removing said solution from the grain, and separating the seed coat from the interior portion of the grain.

5. A process for removing the seed coat from sorghum grains comprising extracting oily, fatty and waxy materials from the seed coat by means of petroleum ether, substantially completely removing said petroleum ether from the grain, together with the oily, fatty and waxy materials, immersing the grain in an aqueous solution having a concentration of about 0.25% to about 0.75% sodium hydroxide until the seed coat is substantially only swelled and loosened, removing said solution from the grain and separating the seed coat from the interior portion of the grain.

6. A process for removing the seed coat from sorghum grains comprising treating the grain with an organic solvent whereby oily, fatty and waxy materials are extracted from the grain, substantially completely removing said organic solvent from the grain, together with said oily, fatty and waxy materials, immersing the grain in an aqueous solution having concentration of about 0.25% to about 0.75% sodium hydroxide until the seed coat is substantially only swelled and loosened, removing said solution from the grain and separating the seed coat from the interior portion of the grain.

WILLIAM B. THRASHER.

REFERENCES CITED

The following references are of record in the file of this patent:

UNITED STATES PATENTS

| Number | Name | Date |
|---|---|---|
| 564,398 | Templeton | July 21, 1896 |
| 695,476 | McFarlane | Mar. 18, 1902 |
| 1,849,786 | Bloede et al. | Mar. 15, 1932 |
| 2,007,693 | Ruter | July 9, 1935 |